(12) United States Patent
Wieber et al.

(10) Patent No.: US 7,954,907 B1
(45) Date of Patent: Jun. 7, 2011

(54) SUPPLEMENTAL BRAKE SYSTEM OF ZERO TURN VEHICLE

(75) Inventors: Donald Wieber, Morristown, TN (US); Koji Irikura, Morristown, TN (US); Masaru Iida, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 837 days.

(21) Appl. No.: 11/860,282

(22) Filed: Sep. 24, 2007

(51) Int. Cl.
*B60T 13/74* (2006.01)
(52) U.S. Cl. .................................. 303/3; 188/106 P
(58) Field of Classification Search ............... 303/2, 13; 188/106 P
See application file for complete search history.

(56) References Cited

U.S. PATENT DOCUMENTS

| 6,609,357 B1 * | 8/2003 | Davis et al. ............... 56/10.2 A |
| 2004/0036349 A1 * | 2/2004 | Lin ............................... 303/15 |
| 2007/0151222 A1 * | 7/2007 | Iida et al. .................... 56/157 |

FOREIGN PATENT DOCUMENTS

| JP | 2540265 | 4/1997 |
| JP | 2001221080 A * | 8/2001 |

* cited by examiner

*Primary Examiner* — Thomas J Williams
(74) *Attorney, Agent, or Firm* — Sterne, Kessler, Goldstein & Fox P.L.L.C.

(57) ABSTRACT

A supplemental brake system of a zero turn vehicle has a prime mover, a brake pedal, a pair of axles, and a pair of transaxles driven by the prime mover so as to drive the respective axles. The transaxles include respective brakes for braking the respective axles according to depression of the brake pedal. Also included are supplemental braking means for stopping transmission of power from the prime mover to the pair of transaxles according to depression of the brake pedal.

6 Claims, 13 Drawing Sheets

SUPPLEMENTAL BRAKE SYSTEM OF ZERO TURN VEHICLE

BACKGROUND OF THE INVENTION

1. Field of the Invention

The present invention relates to a supplemental brake system of a zero turn vehicle, such as a mower, having a pair of drive wheels and a pair of left and right drive units, such as hydraulic motors, for driving the respective drive wheels.

2. Related Art

As disclosed in Japanese Utility Model No. 2540265, there is a well-known, conventional vehicle brake system for evenly applying braking forces to left and right wheels in response to the depression of a single brake pedal. This conventional brake-equalizing system is especially convenient for a zero turn vehicle, such as a zero turn mower, that is equipped with a pair of left and right transaxles for driving the respective wheels. Because each transaxle includes its own brake, the conventional system allows both brakes to be connected to the common brake pedal.

However, because a zero turn vehicle is equipped with a pair of drive operation devices (such as levers) for controlling its respective transaxles, it is difficult for an inexperienced operator to correct the traveling direction of the vehicle immediately after releasing the brake pedal, particularly when the vehicle is braked on a slope. Because zero turn mowers are becoming more popular with retail consumers, many of whom do not have the same experience level as commercial operators, a supplemental brake system is needed to safely keep a vehicle stationary after the brake pedal is released.

SUMMARY OF THE INVENTION

An object of the invention is to provide a supplemental brake system of a zero turn vehicle that can safely keep the vehicle stationary, while still ensuring ease of operability after the brake pedal is released.

To achieve the object, according to the invention, a supplemental brake system of a zero turn vehicle comprises: a prime mover; a brake pedal; a pair of axles; a pair of transaxles driven by the prime mover so as to drive the respective axles, the transaxles including respective brakes for braking the respective axles according to depression of the brake pedal; and supplemental braking means for stopping transmission of power from the prime mover to the pair of transaxles according to depression of the brake pedal.

When the brake pedal is depressed, two things occur: (1) the supplemental braking means stops power transmission from the prime mover to the transaxles and (2) the brakes of the respective transaxles are applied. Accordingly, a very large combined braking force is applied, which ensures a safe, controlled vehicle restart after the brake pedal is released.

Preferably, the supplemental braking means stops power transmission via the prime mover according to depression of the brake pedal. In this case, the stopped prime mover is preferably restarted when both the transaxles are set in neutral while the brake pedal is still depressed.

In one embodiment of the invention, the supplemental braking means includes a sensor disposed adjacent to the brake pedal so as to detect whether the brake pedal is depressed or not. In this case, the supplemental braking means stops power transmission via the prime mover when the sensor detects depression of the brake pedal. Preferably, the stopped prime mover is restarted when both the transaxles are set in neutral while the sensor detects depression of the brake pedal.

In another embodiment of the invention, the supplemental braking means includes a sensor disposed adjacent to a portion of at least one of the transaxles operatively connected to the brake pedal, so as to detect whether or not the brake pedal is depressed. In this case, the supplemental braking means stops the prime mover when the sensor detects depression of the brake pedal. Preferably, the stopped prime mover is restarted when both the transaxles are set in neutral while the sensor detects the depression of the brake pedal.

In another embodiment of the invention, a belt transmission is interposed between the prime mover and the pair of transaxles. In this case, the supplemental braking means includes a belt clutch of the belt transmission so that the belt clutch is disengaged according to depression of the brake pedal. This prevents power transmission from the prime mover to the pair of transaxles via the belt transmission.

In another embodiment of the invention, an equalizer is interposed between the brake pedal and the pair of brakes of the respective transaxles so as to evenly apply the brakes according to depression of the brake pedal.

In another embodiment of the invention, a differential lock device is interposed between the transaxles so as to lock the axles to each other according to depression of the brake pedal. This results in even braking forces across the pair of brakes, which prevents unstable stopping of the vehicle. Furthermore, the vehicle is prevented from restarting in an unexpected direction after the brake pedal is released.

These and other objects, features, and advantages of the present invention will appear more fully from the following description with reference to accompanying drawings.

DETAILED DESCRIPTION OF THE INVENTION

Figure 1:
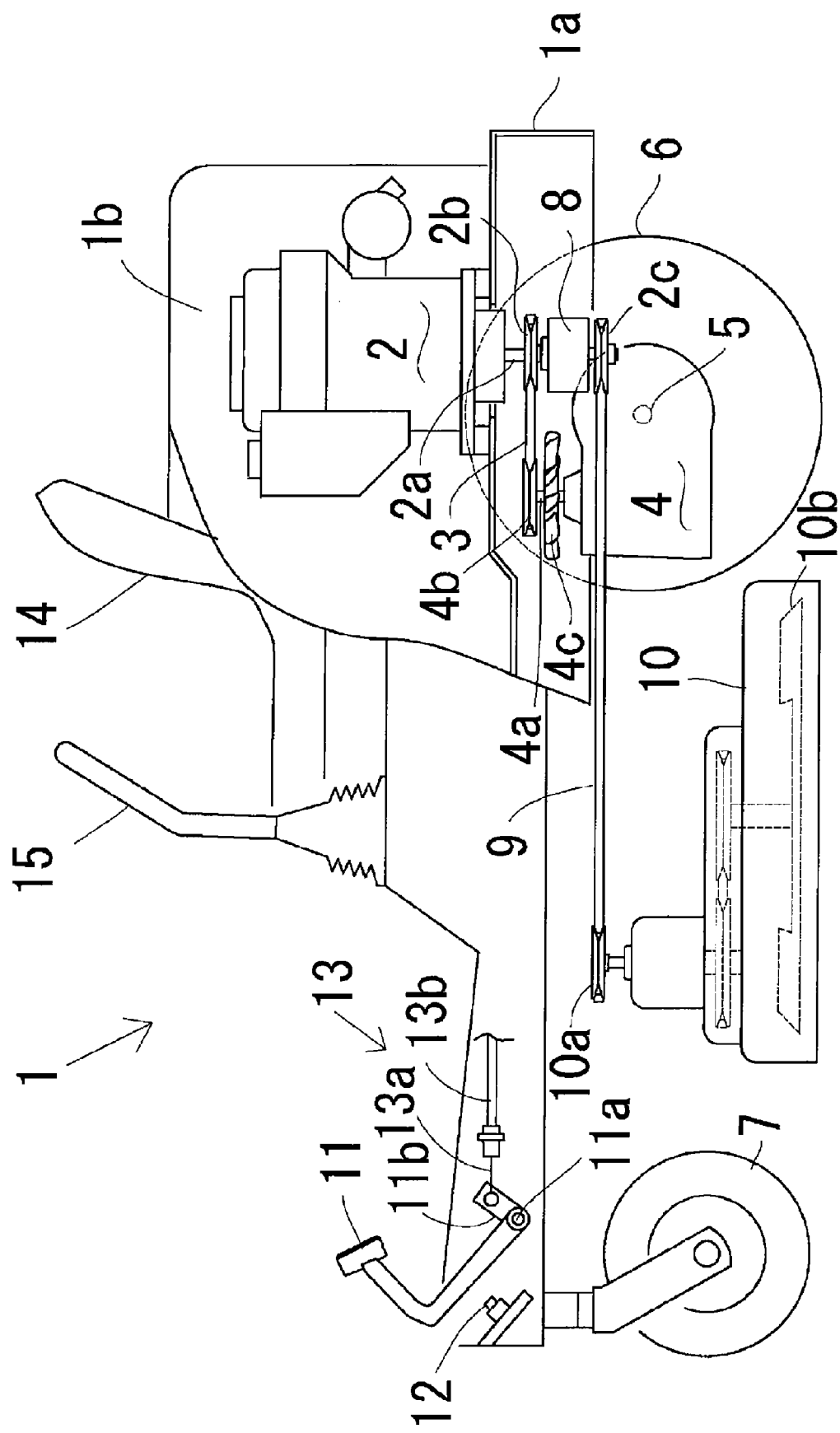
FIG. 1 is a side view of a zero turn mower serving as an example of zero turn vehicles, equipped with a first supplemental brake system.

An entire structure of a zero turn mower 1, serving as an example of zero turn vehicles which can employ the present supplemental brake system, will be described with reference to FIGS. 1 and 2. Hereinafter, zero turn mower 1 is simply referred to as vehicle 1. Vehicle 1 shown in FIG. 1 can employ any of the supplemental brake systems discussed below. However, FIG. 1 illustrates vehicle 1 provided with brake-sensor switch 12 of a representative first supplemental brake system.

With respect to the upper portion of vehicle 1 above a vehicle body frame 1a, an engine 2 serving as a prime mover is mounted on a rear portion of vehicle body frame 1a, and is covered with a bonnet 1b. An operator's seat 14 is mounted on a front portion of bonnet 1b, and a pair of left and right drive control levers 15 are disposed on left and right sides of seat 14. A brake pedal 11 is disposed just above the front end portion of body frame 1a in front of seat 14.

With respect to the lower portion of vehicle 1 below vehicle body frame 1a, a vertical engine output shaft 2a is extended downward from engine 2, an axle-driving output pulley 2b is fixed on a vertical intermediate portion of engine output shaft 2a, and a mower-driving output pulley 2c is fixed on the bottom end portion of engine output shaft 2a. A PTO clutch unit 8 is provided on engine output shaft 2a between pulleys 2b and 2c. A pair of left and right transaxles 4 are laterally juxtaposed below the rear portion of vehicle body frame 1a. Left and right transaxles 4 support respective left and right axles 5 projecting laterally outward therefrom, and rear drive wheels 6 are fixed on outer ends of respective axles 5. One or more casters 7, serving as a front wheel or front wheels, are extended downward from the front end portion of vehicle body frame 1a. A mower deck 10 incorporating one or more rotary blades 10b is disposed below a fore-and-aft intermediate portion of vehicle body frame 1a between front wheel or wheels 7 and rear wheels 6.

An axle-driving belt transmission system is interposed between engine 2 and left and right transaxles 4 so as to distribute power of engine 2 between transaxles 4. Left and right transaxles 4 have respective left and right vertical input shafts 4a, which project upward so as to be fixedly provided thereon with respective input pulleys 4b and respective cooling fans 4c. A belt 3 is looped over output pulley 2b and input pulleys 4b. Further, belt 3 is looped over a pair of left and right tension pulleys 19, each of which is disposed between output pulley 2b and corresponding input pulley 4b so as to maintain tension in belt 3. Each tension pulley 19 may be supported by a variety of structures, such as transaxles 4 or vehicle body frame 1a. Incidentally, each tension pulley 19 may serve as a belt clutch as discussed later referring to FIG. 7.

Mower deck 10 is provided at the top portion thereof with a mower-driving input pulley 10a, and a mower-driving belt 9 is interposed between pulleys 2c and 10a so as to transmit power from engine 2 to rotary blade or blades 10b.

Figure 9:
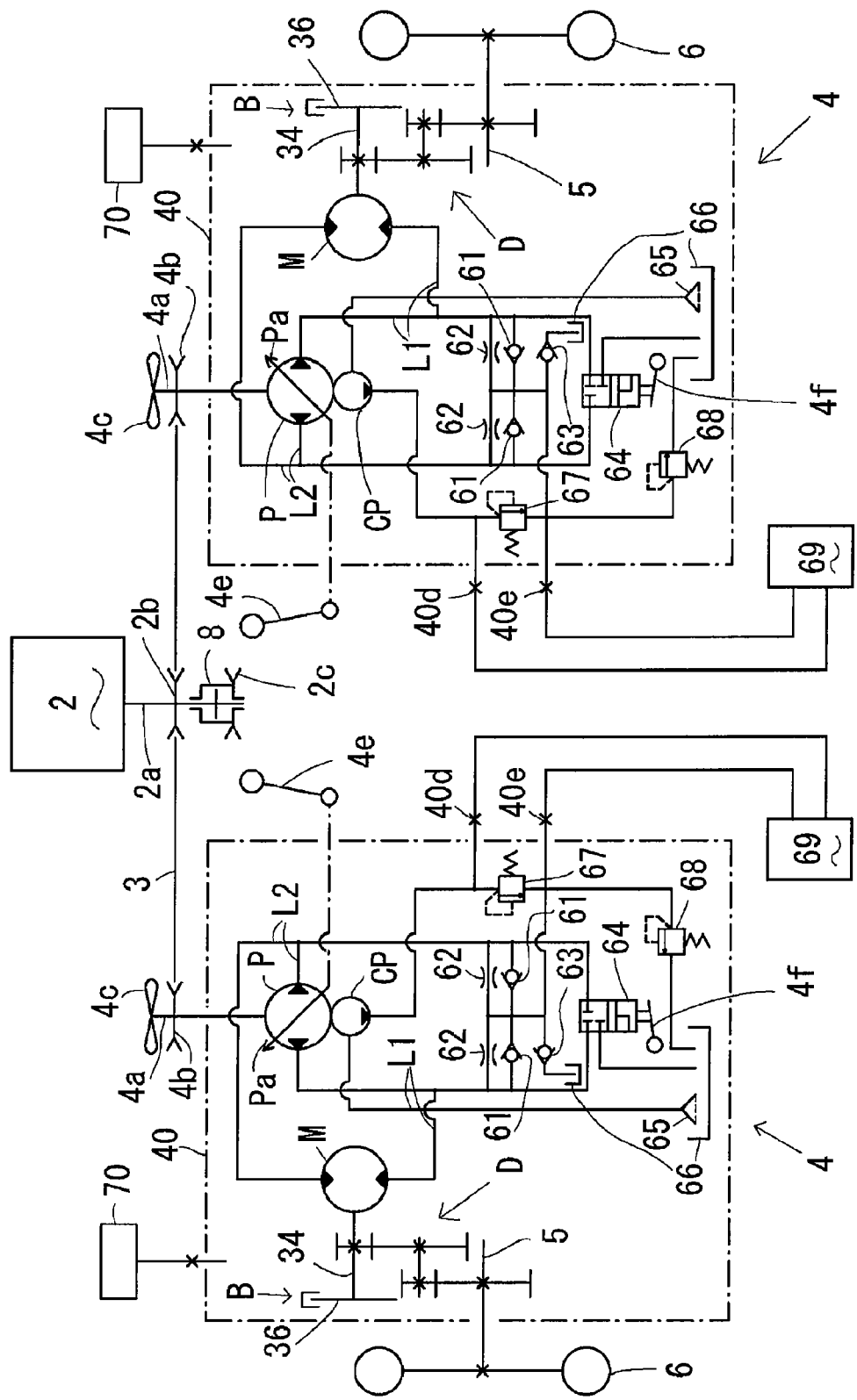
FIG. 9 is a hydraulic circuit diagram of a pair of transaxles with the fourth supplemental brake system.

Each transaxle 4 may incorporate any transmission interposed between input shaft 4a and axle 5. A typical transmission is a hydrostatic stepless transmission (hereinafter, "HST") including a mutually, fluidly connected hydraulic pump and motor. Hereinafter, description will be given on the assumption that each transaxle 4 incorporates an HST including a variable displacement hydraulic pump P and a fixed displacement hydraulic motor M, as shown in FIG. 9.

Each of left and right transaxles 4 is pivotally provided on the laterally distal side thereof with a drive control arm 4e to be connected to each left or right drive control lever 15. More specifically, left drive control arm 4e is pivoted on a left side of left transaxle 4, and right drive control arm 4e is pivoted on a right side of right transaxle 4. Left and right drive control levers 15 are pivoted on respective lateral horizontal pivot shafts 15a, rotatably in the vertical fore-and-aft direction. Each drive control lever 15 is provided rotatably, integrally with a vertically fore-and-aft rotatable arm 15b extended substantially opposite to drive control lever 15 with respect to pivot shaft 15a, and each arm 15b is pivotally connected to drive control arm 4e through a fore-and-aft extended link rod 16.

Each drive control lever 15 has a fore-and-aft rotatable range. The foremost end of the range is defined as the maximum forward-traveling speed position, the rearmost end of the range is defined as the maximum backward-traveling speed position, and the middle position of the range is defined as a neutral position. The portion of the range between the neutral position and the maximum forward-traveling speed position is defined as a forward traveling speed range, and the portion of the range between the neutral position and the maximum backward-traveling speed position is defined as a backward traveling speed range.

By rotating drive control lever 15 vertically forward from the neutral position toward the maximum forward-traveling speed position, arm 15b is rotated vertically rearward so as to push rod 16 rearward, thereby rotating drive control arm 4e vertically rearward. By rotating drive control lever 15 vertically rearward from the neutral position toward the maximum backward-traveling speed position, arm 15b is rotated vertically forward so as to pull rod 16 forward, thereby rotating drive control arm 4e vertically forward. In the case that hydraulic pump P and motor M are disposed in transaxle 4, drive control lever 15 typically serves as a manipulator, interlocking with a movable swash plate of hydraulic pump P so as to change the delivery direction and delivery amount of hydraulic pump P to hydraulic motor M.

Figure 2:
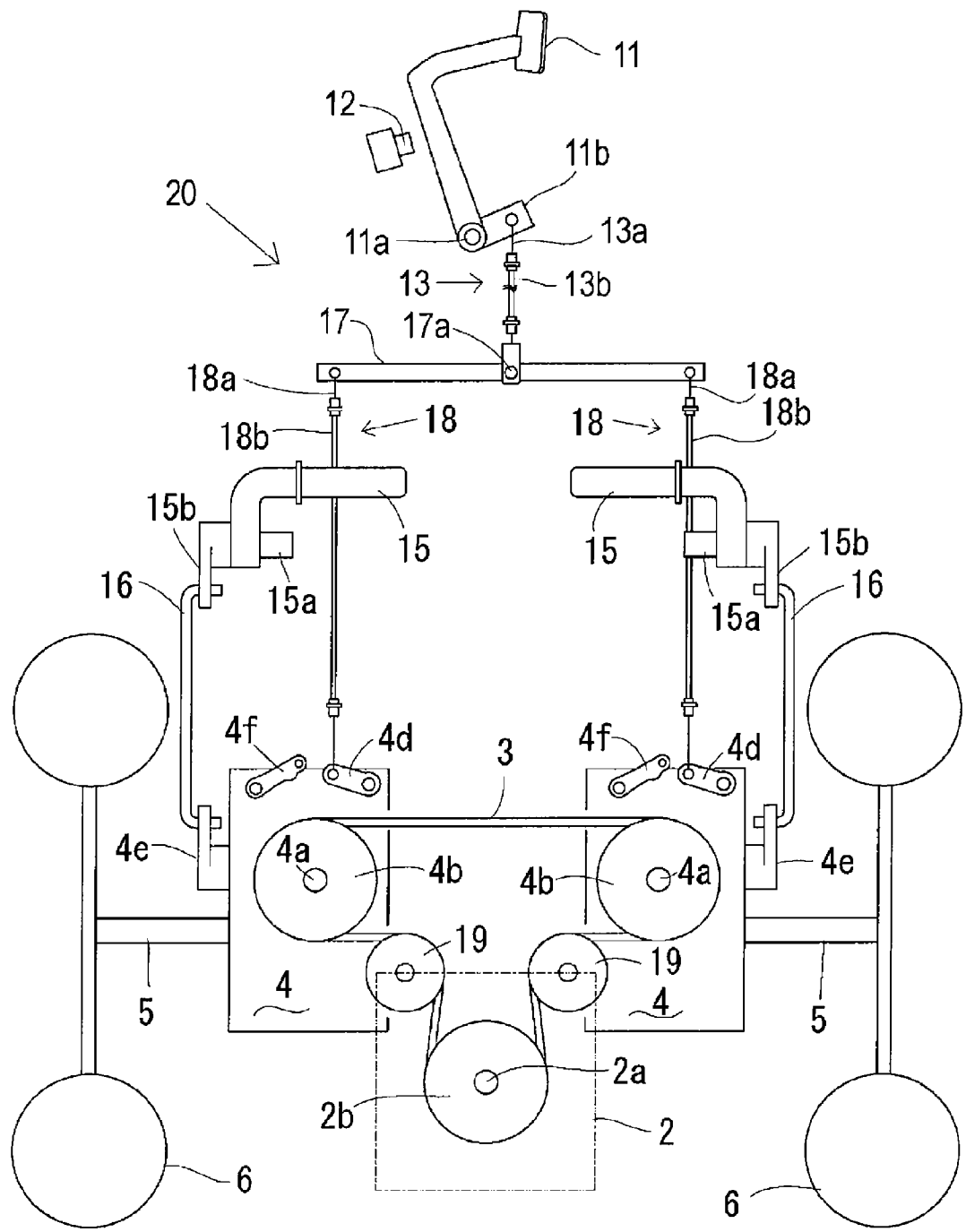
FIG. 2 is a schematic plan view of the first supplemental brake system.

FIG. 2 describes an equalized brake operation system 20. Left and right transaxles 4 are pivotally provided on top portions thereof with respective horizontally fore-and-aft rotatable brake arms 4d having vertical pivot axes (i.e., brake camshafts 37, discussed below). Incidentally, as discussed later, left and right transaxles 4 are provided on top portions thereof with respective horizontally fore-and-aft rotatable bypass arms 4f having vertical pivot axes (i.e., bypass valve shafts 64, discussed below).

A substantially, laterally horizontal equalizer bar 17 is disposed between brake pedal 11 and brake arms 4d. Brake pedal 11 is vertically, rotatably pivoted on a lateral, horizontal pivot shaft 11a, and an arm 11b is extended substantially opposite to brake pedal 11 with respect to pivot shaft 11a rotatably, integrally with brake pedal 11. Incidentally, with respect to FIG. 2, as well as FIGS. 4, 7 and 8, while equalized brake operation system 20 is illustrated as a plan view, brake pedal 11, pivot shaft 11a and arm 11b are illustrated as a side view for convenience to description.

A fore-and-aft extended wire 13 is interposed between brake pedal 11 and equalizer bar 17. Wire 13 includes an inner wire 13a and an outer wire 13b. Inner wire 13a is connected at the front end thereof to arm 11b, and is connected at the rear end thereof to a lateral center point 17a of equalizer bar 17, so as to be pulled forward or pushed backward depending on whether brake pedal 11 is depressed or released. Outer wire 13b is fixed at ends thereof to vehicle body frame 1a, e.g., so as to relatively, slidably pass inner wire 13a therethrough.

Figure 7:
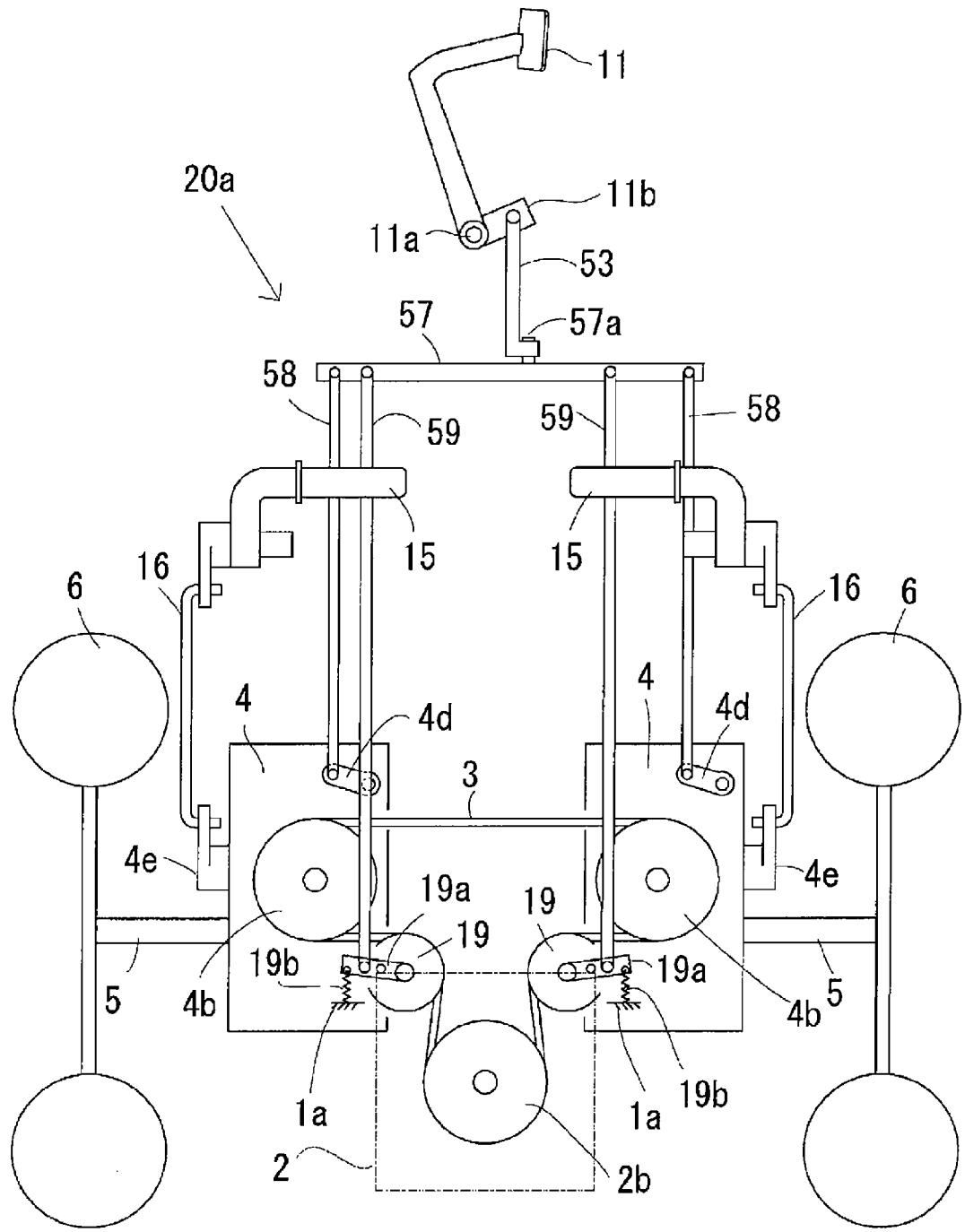
FIG. 7 is a schematic plan view of a third supplemental brake system.
Figure 8:
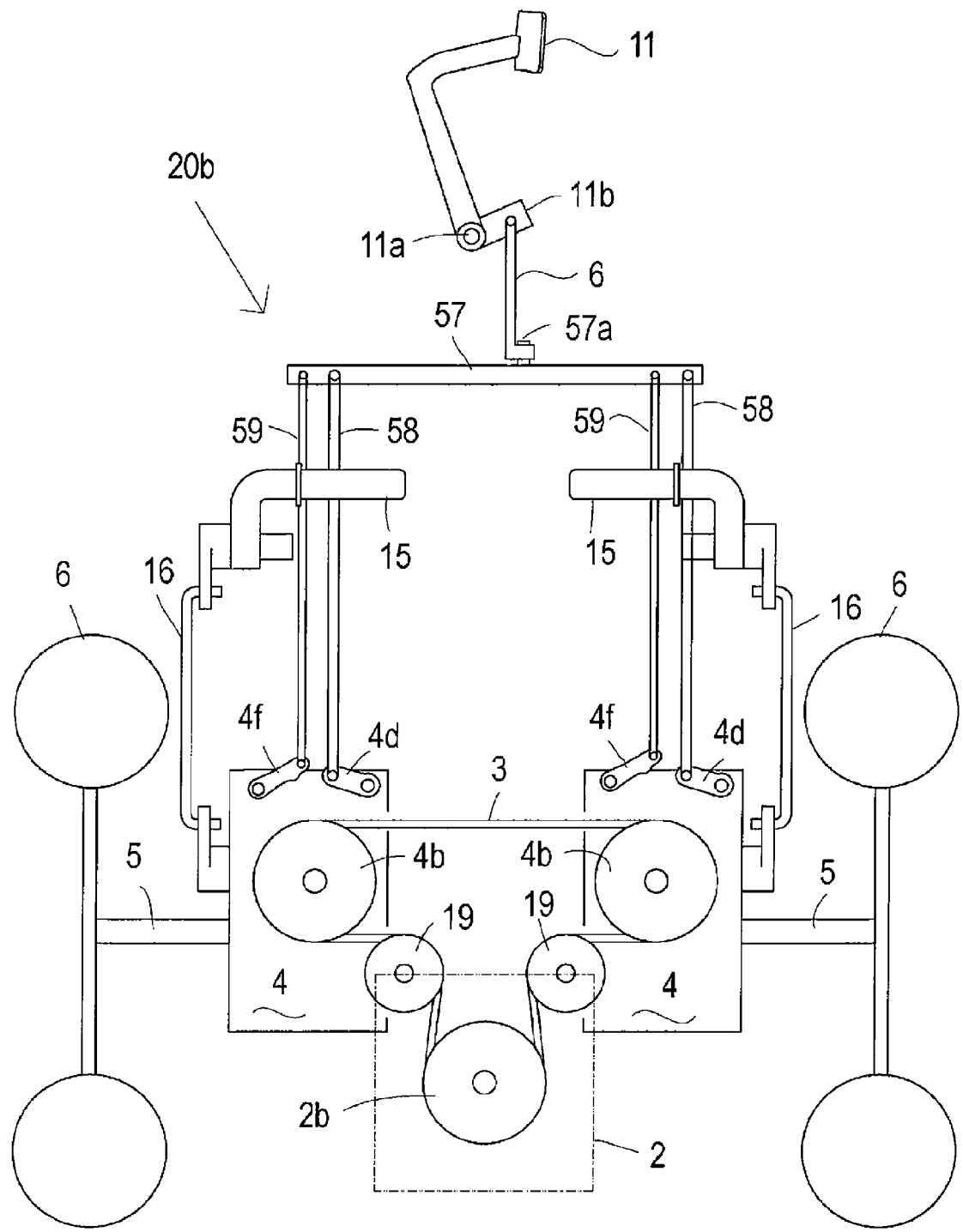
FIG. 8 is a schematic plan view of a fourth supplemental brake system.

A pair of left and right wires 18 are extended rearward from respective left and right ends of equalizer bar 17. Each of wires 18 has an inner wire 18*a* and an outer wire 18*b*. Inner wire 18*a* is connected at the front end thereof to either the left or right end of equalizer bar 18, and is connected at the rear end thereof to brake arm 4*d*, so as to be pulled forward or pushed backward depending on whether brake pedal 11 is depressed or released. Outer wire 18*b* is fixed at ends thereof to vehicle body frame 1*a*, e.g., so as to relatively, slidably pass inner wire 18*a* therethrough. Wires 13 and 18 may be replaced with respective link rods 53 and 58 as shown in FIGS. 7 and 8.

Since equalizer bar 17 fore-and-aft slides without tilting according to the motion of brake pedal 11, left and right inner wires 18*a* are evenly pulled forward or pushed backward so as to evenly rotate left and right brake arms 4*d*, thereby simultaneously and evenly applying or releasing the brakes in respective left and right transaxles 4.

Figure 5:
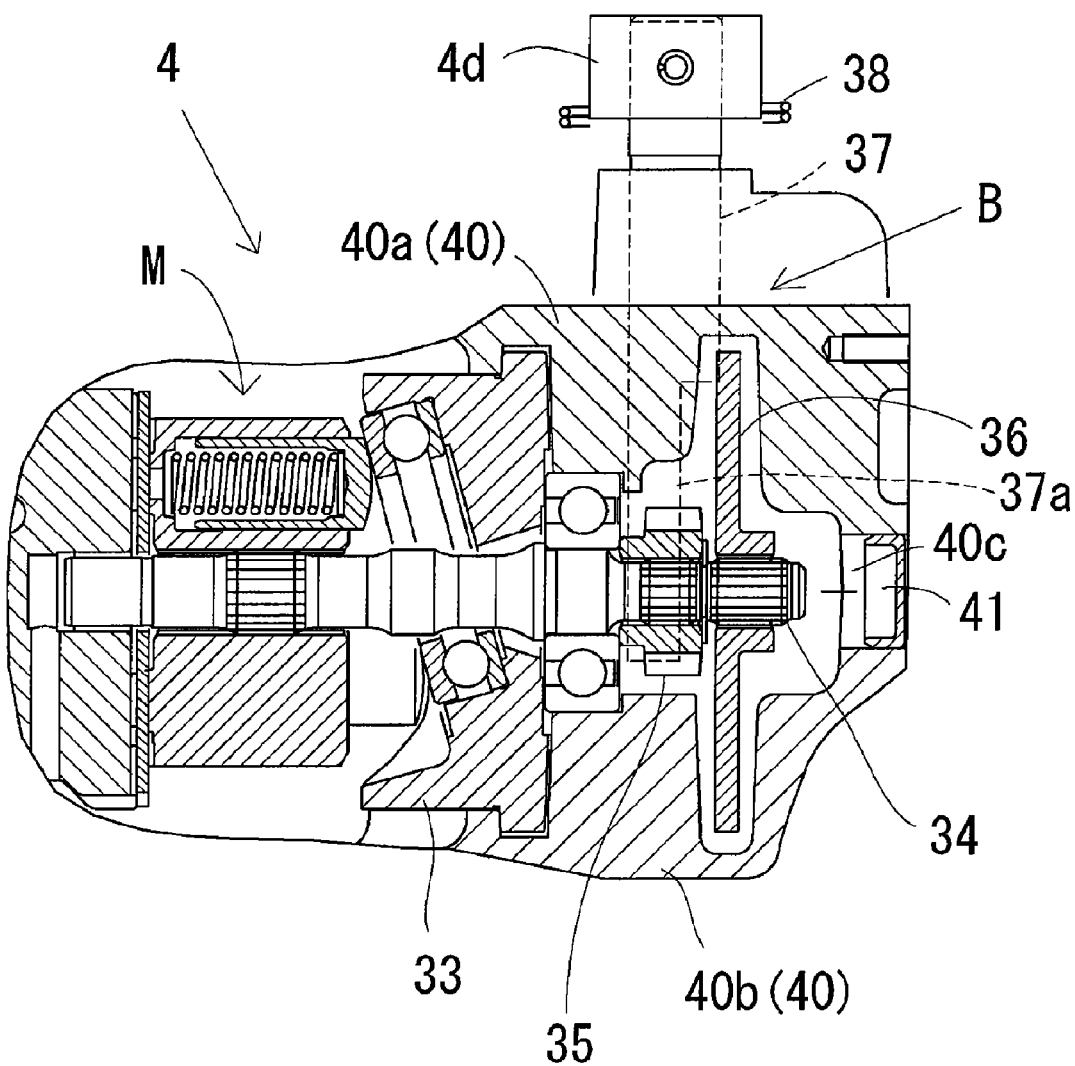
FIG. 5 is a sectional rear view of a principal portion of a transaxle showing a hydraulic motor and a motor shaft with a brake disk thereon.
Figure 6:
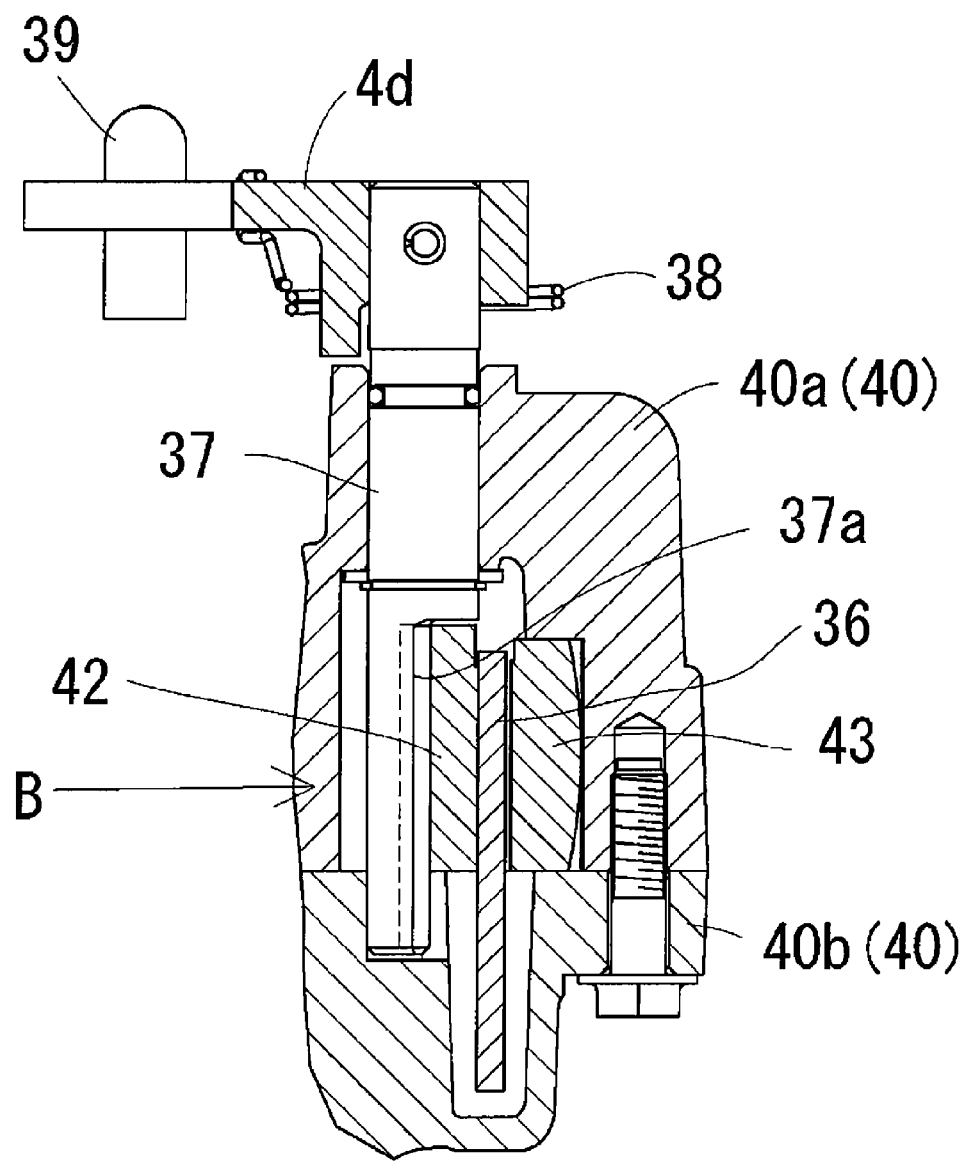
FIG. 6 is a sectional rear view of a principal portion of the transaxle showing a brake camshaft.

A typical brake B provided in transaxle 4, shown in FIGS. 5 and 6, will be described. In a casing 40 of transaxle 4, a horizontal motor shaft 34 is extended from hydraulic motor M through a fixed swash plate 33 of hydraulic motor M, and is fixedly provided thereon with a motor output gear 35 and a brake disk 36.

Incidentally, casing 40 includes an upper casing half 40*a* and a lower casing half 40*b* joined each other through a horizontal joint surface on which the horizontal center axis of motor shaft 34 is disposed. An outer-and-inner opened hole 40*c* is formed between upper and lower casing halves 40*a* and 40*b* so as to coaxially face an outer end of motor shaft 34 in casing 40, and is plugged with a cap 41.

If motor shaft 34 has to be extended outward from casing 40 of transaxle 4, cap 41 is removed so as to allow motor shaft 34 to pass through hole 40*c*. As discussed below referring to FIG. 12, the portions of motor shafts 34 projecting outward from casings 40 of left and right transaxles 4 through respective holes 40*c* may be connected to each other through a differential lock clutch 77. Alternatively, the portion of motor shaft 34 projecting outward from casing 40 through hole 40*c* can be provided thereon with an outer dry brake replacing illustrated wet brake B, or can serve as a target for rotary speed detection for automatically controlling rotary speed of the front wheels (if the front wheels are drive wheels) during turning of a vehicle, or for controlling a governor.

Brake disk 36 is disposed between friction members 42 and 43. Vertical brake camshaft 37 is rotatably supported by casing 40 of transaxle 4, and projects upward from casing 40 so as to be fixedly provided thereon with brake arm 4*d*. In casing 40, a lower portion of brake camshaft 37 is sectionally semicircularly cut off so as to have a vertical flat cam surface 37*a* facing friction member 42 opposite to brake disk 36.

When brake arm 4*d* is disposed at a non-braking position, corresponding to undepressed brake pedal 11, cam surface 37*a* is disposed in parallel to friction member 42 so as to be spaced from friction member 42, and brake disk 36 is separated from friction members 42 and 43 on the opposite sides thereof, thereby allowing rotation of motor shaft 34, i.e., axle 5. When brake arm 4*d* is disposed at a braking position corresponding to depressed brake pedal 11, cam surface 37*a* is tilted to press its edge against friction member 42 so as to press brake disk 36 between friction members 42 and 43, thereby braking motor shaft 34, i.e., axle 5. Incidentally, a stopper pin 39 is fixed on casing 40 or brake arm 4*d* so as to define either the non-braking position or the braking position of brake arm 4*d*, and a spring 38 is wound around brake arm 4*d* so as to retain brake arm 4*d* at either the braking position or the non-braking position.

Figure 3:
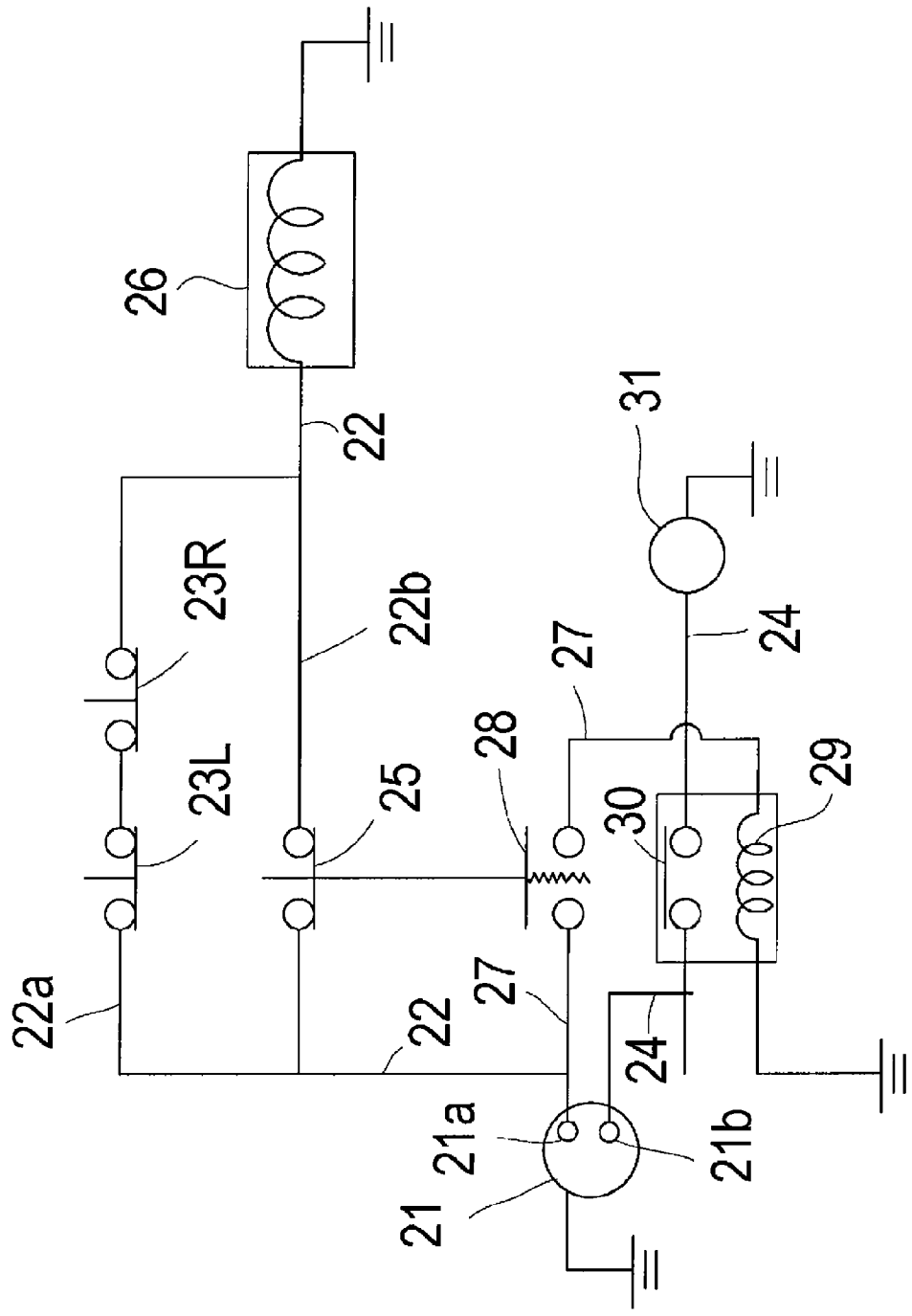
FIG. 3 is an electronic circuit diagram for controlling an engine according to the first supplemental brake system.

Equalized braking operation system 20 is combined with a brake-sensor switch 12 disposed adjacent to brake pedal 11 so as to constitute a first supplemental brake system. Referring to FIG. 3, an electric circuit for the first supplemental brake system will be described. The electric circuit includes a normal engine-starting circuit. In this regard, a key switch 21 is provided with a switch-on terminal 21*a* and a starting terminal 21*b*. A line from switch-on terminal 21*a* is bifurcated into first and second lines 22 and 27. First line 22 is extended to a solenoid 26 of a fuel injection valve, i.e., a control valve for a fuel injection pump of engine 2. Second line 27 is extended to a coil 29 to be excited for switching on a starter switch 30. A brake switch 28 is interposed between terminal 21*b* and coil 29 on line 27 and is operatively connected to brake-sensor switch 12. A line 24 is extended from starting terminal 21*b* to starter motor 31.

Line 22 has bifurcated parallel lines 22*a* and 22*b* at an intermediate portion. A pair of neutral switches 23L and 23R are disposed in series on line 22*a*. Switches 23L and 23R are connected to respective sensors for detecting respective positions of drive control arms 4*e*. Each of switches 23L and 23R is switched on only when the corresponding sensor detects that corresponding drive control arm 4*e* is disposed at the neutral position. To constitute the first supplemental brake system, a switch 25 is disposed on line 22*b*. Lines 22*a* and 22*b* are joined to be connected to solenoid 26. Switch 25 is synchronously connected to brake switch 28 so that switch 25 is switched on by switching off brake switch 28, and that switch 25 is switched off by switching on brake switch 28. Due to the parallel lines 22*a* and 22*b*, to excite solenoid 26 for supplying fuel to engine 2, either a first or second condition has to be realized. The first condition is that both neutral switches 23L and 23R are switched on by setting both left and right drive control levers 15 at respective neutral positions. The second condition is that switch 25 is switched on by releasing brake pedal 11.

A process for starting engine 2 to start vehicle 1 will be described. When an operator sits on seat 14, he or she ascertains whether both left and right drive control levers 15 are set at the neutral positions or not. When both left and right drive control levers 15 are set at their neutral positions, solenoid 26 can be excited for opening the fuel injection valve. However, to activate starter motor 31, the operator has to depress brake pedal 11 so as to switch on brake switch 28. After the operator depresses brake pedal 11, the operator turns key switch 21 to terminal 21*a*, whereby current flows to coil 29 through line 27 and brake switch 28 which is switched on by the depression of brake pedal 11. Thus, coil 29 is excited to switch on starter switch 30. Afterward, the operator turns key switch 21 to terminal 21*b*, so that current flows to starter motor 31 through line 24 and switched-on starter switch 30. In this way, engine 2 cannot be started before both left and right drive control levers 15 are set in the neutral position and brake pedal 11 is depressed, thereby ensuring the safety of vehicle 1 and its operator when engine 2 starts.

While vehicle 1 is moving, at least one of the drive control levers 15 is necessarily deviated from the neutral position so as to switch off corresponding neutral switch 23L or 23R. However, since brake pedal 11 is necessarily released, switch 25 is kept switched on so as to keep solenoid 26 excited. Brake switch 28 is switched off so as to stop starter motor 31.

When the operator depresses brake pedal 11 during operation of vehicle 1, switch 25 is switched off on the condition that at least one of neutral switches 23L and 23R is switched off. Consequently, solenoid 26 is unexcited so as to stop the supply of fuel to engine 2, thereby immediately stopping engine 2. As long as brake pedal 11 is depressed, brake switch 28 is switched on so as to be ready to activate starter motor 31, however, solenoid 26 is kept unexcited so as to keep engine 2 inactive before both drive control levers 15 are set to the neutral positions. In other words, once engine 2 is stopped by depressing brake pedal 11 during operation of vehicle 1, to excite solenoid 26 and restart engine 2, the operator must release brake pedal 11 or return both drive control levers 15 to their neutral positions, thereby ensuring the safety of vehicle 1 and its operator when engine 2 restarts. Incidentally, even while solenoid 26 is excited, because engine 2 is stopped, an operator has to return key switch 21 to terminal 21a, and then he or she has to turn key switch 21 to terminal 21b so as to activate starter motor 31 to restart engine 2.

Figure 4:
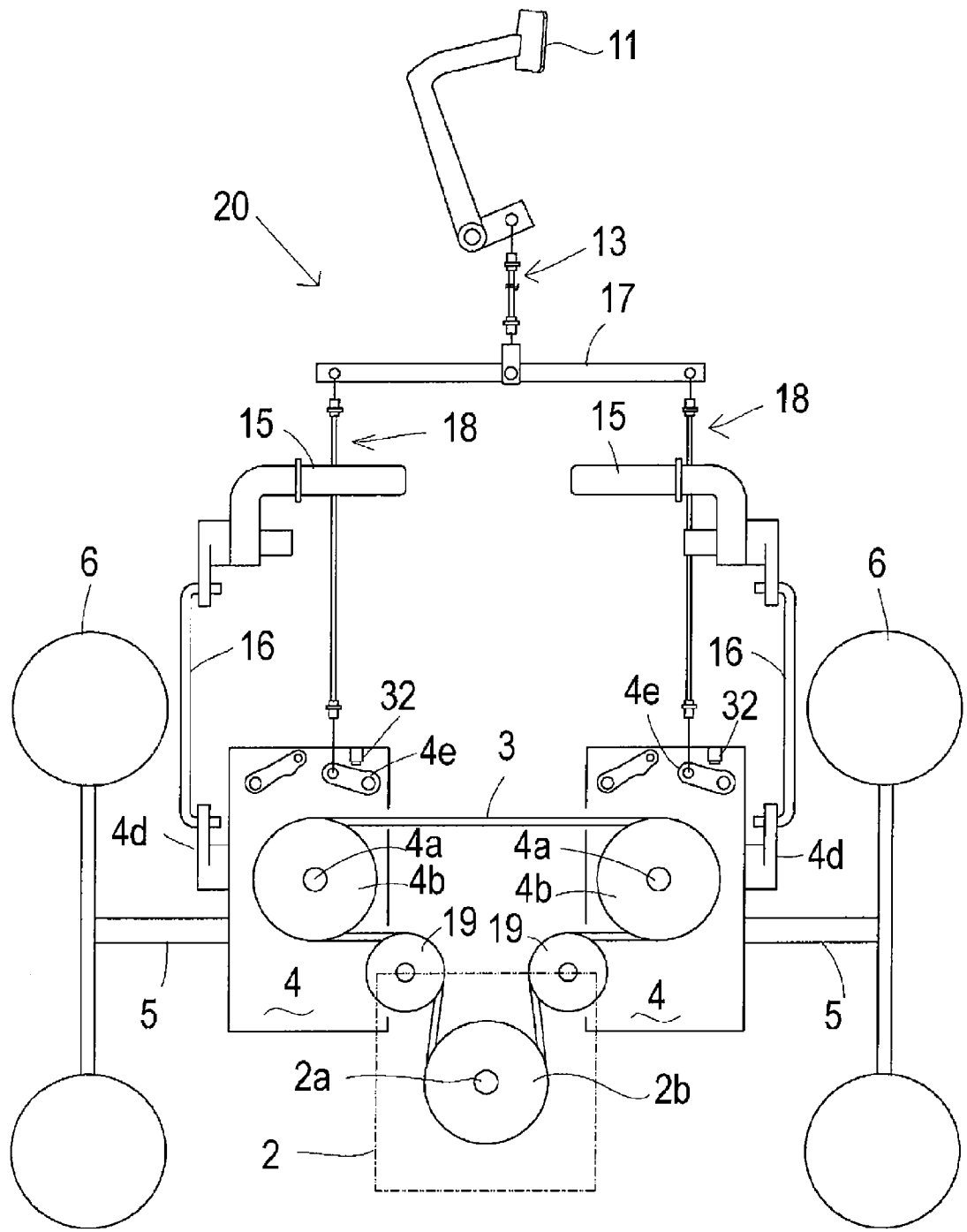
FIG. 4 is a schematic plan view of a second supplemental brake system.

Equalized brake operation system 20 shown in FIG. 4 is adapted as an alternative second supplemental brake system. The only major difference between this second supplemental brake system and the first supplemental brake system shown in FIGS. 1 and 2 is the position of the brake-sensor switch for detecting whether or not brake pedal 11 is depressed. In the second supplemental brake system, a brake-sensor switch 32 is provided on transaxle 4 adjacent to brake arm 4d, so as to detect whether brake arm 4e is disposed at the braking position or the non-braking position. Although FIG. 4 illustrates two brake-sensor switches 32 provided on respective left and right transaxles 4, brake-sensor switch 32 on one of transaxles 4 is sufficient for detecting whether brake pedal 11 is depressed or not, because brake arms 4d of both transaxles 4 are necessarily simultaneously operated according to the depression of brake pedal 11. The second supplemental brake system employs the electric circuit shown in FIG. 3 on the assumption that brake switch 28 and switch 25 are operatively connected to brake-sensor switch (or switches) 32.

An equalized brake operation system 20a shown in FIG. 7 is adapted as a third alternative supplemental brake system. The distinct feature of the third supplemental brake system as compared to the first and second supplemental brake systems shown in FIGS. 1 to 4 is the nature of the supplemental braking means for supplementally braking vehicle 1. More specifically, to supplementally brake vehicle 1, tension pulleys 19 of the belt transmission between engine 2 and the pair of transaxles 4 are used as belt clutches, and they act to clutch off the belt transmission.

In this regard, a fore-and-aft extended rod 53 is interposed between brake pedal 11 and a lateral center point 57a of an equalizer bar 57, so as to be pulled forward or pushed backward depending on whether brake pedal 11 is depressed or released. A pair of left and right rods 58 are extended rearward from respective left and right ends of equalizer bar 57, and are connected at respective rear ends thereof to respective brake arms 4d of transaxles 4, so as to be pulled forward or pushed backward depending on whether brake pedal 11 is depressed or released. Thus, the brakes (brakes B) in respective transaxles 4 are simultaneously and evenly applied or released according to depression or release of brake pedal 11.

Furthermore, a pair of rods 59 are extended rearward from respective left and right opposite portions of equalizer bar 57 with respect to lateral center point 57a, and are connected at respective rear ends thereof to respective arms 19a of tension pulleys 19, so as to be pulled forward or pushed backward depending on whether brake pedal 11 is depressed or released. Each arm 19a is pivoted at one end thereof onto a pivot shaft of each tension pulley 19 serving as the belt clutch, and is connected at the other end thereof to one end of a spring 19b, which is connected at the other end thereof to vehicle body frame 1a, casing 40 of transaxle 4, or any other appropriate component. Spring 19b biases tension pulley 19 to press belt 3. The rear end of rod 59 is pivotally connected at an intermediate portion of arm 19a between the opposite ends of arm 19a.

When brake pedal 11 is depressed, rods 59 are simultaneously and evenly pulled forward to rotate respective arms 19a so as to release respective tension pulleys 19 from belt 3, i.e., to clutch off the belt transmission. By returning brake pedal 11 to the released position, brake arms 4d are returned to the non-braking positions so as to release the brakes (brakes B) of transaxles 4. Simultaneously, tension pulleys 19 naturally return to be fitted onto belt 3 so as to transmit power from engine 2 to transaxles 4. Incidentally, rods 53, 58 and 59 may be replaced with wires similar to those of equalized brake operation system 20.

An equalized brake operation system 20b shown in FIG. 8 is adapted as a fourth alternative supplemental brake system. The fourth supplemental brake system uses bypass valves in respective transaxles 4 as the supplemental braking means for supplementally braking vehicle 1, on the assumption that transaxles 4 include the respective HSTs. That is, to supplementally brake vehicle 1, the bypass valves are simultaneously opened to drain fluid from closed fluid circuits of the respective HSTs.

Similar to equalized brake operation system 20a, equalized brake operation system 20b includes equalizer bar 57, rod 53 interposed between brake pedal 11 and equalizer bar 57, and rods 58 interposed between equalizer bar 57 and respective brake arms 4d. The primary difference between equalized brake operation system 20b and equalized brake operation system 20a is that rods 59 are interposed between respective left and right portions of equalizer bar 57 and respective bypass arms 4f are pivoted on respective transaxles 4. Rods 53, 58 and 59 may be replaced with wires similar to those of equalized brake operation system 20.

Here, referring to FIG. 9, a hydraulic circuit system of transaxles 4, including the respective HSTs with respective bypass valves 64, will be described. In a casing 40 of each transaxle 4, a closed fluid circuit fluidly connects hydraulic pump P and motor M to each other, and the closed fluid circuit includes a pair of fluid passages L1 and L2 interposed between hydraulic pump P and motor M. Hydraulic pump P is provided with a movable swash plate Pa operatively connected to drive control arm 4e pivoted on casing 40. Depending on which direction moveable swash plate Pa is tilted from its neutral position, hydraulic pump P will deliver fluid to fluid passage L1 or L2, thereby deciding the rotary direction of axle 5.

In casing 40, a deceleration gear train D is interposed between motor shaft 34 of hydraulic motor M and axle 5, and brake B including brake disk 36 fixed on motor shaft 34 is disposed.

A charge pump CP is disposed in casing 40 so as to be driven together with hydraulic pump P by the rotation of input shaft 4a driven by engine 2 through belt 3. Charge pump CP is driven to suck fluid through a fluid filter 65 from a fluid sump 66 provided in casing 40, and to deliver fluid to a hydraulic implement 69 disposed outside of casing 40 through a port 40d provided on casing 40. Fluid drained from hydraulic implement 69 is returned into casing 40 through a port 40e provided on casing 40, and is distributed between a pair of charge check valves 61. The pair of charge check valves 61 are fluidly connected to respective fluid passages L1 and L2, so that, when one of fluid passages L1 and L2 is hydraulically depressed, the corresponding charge check valve 61 is opened to supply fluid to the hydraulically depressed fluid passage L1 or L2.

A pair of orifices 62 bypass respective charge check valves 61 so as to serve as neutral valves for expanding the neutral zone of hydraulic pump P relative to the position of movable swash plate Pa. A supplemental charge check valve 63 is connected to an upstream portion of charge check valves 61 so as to supplementally supply fluid from fluid sump 66 to the closed fluid circuit instead of charge pump CP when vehicle 1 having engine 2 is stopped on a slope, so as to cause fluid to leak from the closed fluid circuit. Pressure regulation valves 67 and 68 are disposed in casing 40. Pressure regulation valve 67 regulates the pressure of fluid delivered from charge pump CP to hydraulic implement 69. Pressure regulation valve 68 regulates the pressure of fluid returned from hydraulic implement 69 to be supplied to charge check valves 62, i.e., to be charged to the closed fluid circuit. A reservoir tank 70 is connected to casing 40 so as to absorb or supply fluid to and from fluid sump 66 in casing 40, in correspondence to volumetric changes of fluid levels in casing 40 depending on whether the HST is activated or not.

Bypass valve 64 is disposed in casing 40 so as to bypass hydraulic pump P and the pair of charge check valves 61 between fluid passages L1 and L2. Bypass valve 64 is operatively connected to bypass arm 4f pivoted on casing 40. Normally, bypass valve 64 is closed. When vehicle 1 has to be towed, bypass arm 4f is manipulated to open bypass valve 64, so as to allow fluid to bypass hydraulic pump P and the pair of charge check valves 61 between fluid passages L1 and L2, and to drain fluid to fluid sump 66, thereby ensuring free rotatability of the corresponding hydraulic motor M and drive wheel 6.

The fourth alternative supplemental brake system employs bypass valves 64 of left and right transaxles 4. As mentioned above, due to equalized brake operation system 20b shown in FIG. 8, when brake pedal 11 is depressed, both brakes B in respective transaxles 4 are evenly applied to stop axles 5, and simultaneously, bypass arms 4f are evenly operated to open respective bypass valves 64 so as to drain fluid from the HST closed fluid circuits of transaxles 4 to respective fluid sumps 66. Even if brake pedal 11 is returned to the released position while both drive control levers 15 are not set at the respective neutral positions, the decompression of the closed fluid circuits of transaxles 4 prevents vehicle 1 from suddenly starting. Incidentally, as long as the drive of engine 2 is kept, charge pump CP supplies fluid to the closed fluid circuit, thereby swiftly restoring the original hydraulic pressure.

An fifth alternative supplemental brake system will be described with reference to FIGS. 10 and 11. On a casing of each transaxle 4, drive control arm 4e and brake arm 4d are pivoted so as to be connected through a link arm 81 and a link rod 82. The layout of arms 4e and 4d on the casing of transaxle 4 is such that it allows for an optimal connection between arms 4e and 4d through link arm 81 and link rod 82.

As mentioned above, brake arms 4d are pivoted at base ends thereof onto the respective casing of transaxles 4, and are connected at the tips thereof to equalizer bar 17 or 57 through rod 58 or wire 18, so as to be operatively connected to brake pedal 11. Drive control arms 4e are pivoted at base ends thereof onto the respective casings of transaxles 4, and are connected at the tips thereof to respective drive control levers 15 through rod 16.

Drive control arm 4e is formed with a hole 80 in an intermediate portion thereof between the tip and the base end. Hole 80 has opposite ends 80a of an edge (close to the tip of drive control arm 4e), and has slant edges 80c and 80d extended from respective ends 80a and 80b toward the base end of drive control arm 4e. Edges 80c and 80d are slanted so that the distance between edges 80c and 80d is reduced as it goes toward the base end of drive control arm 4e. That is, hole 80 is substantially triangular. Link arm 81 is inserted at one end thereof into hole 80, and pivotally connected at the other end thereof to one end of link rod 82. Link arm 81 is formed in an "L" shape, bent between the opposite ends thereof, and pivoted on a pivot axis 81a at the bent corner thereof. Brake arm 4d is pivotally connected to the other end of link rod 82 at an intermediate portion thereof between the tip and the base end.

Figure 10:
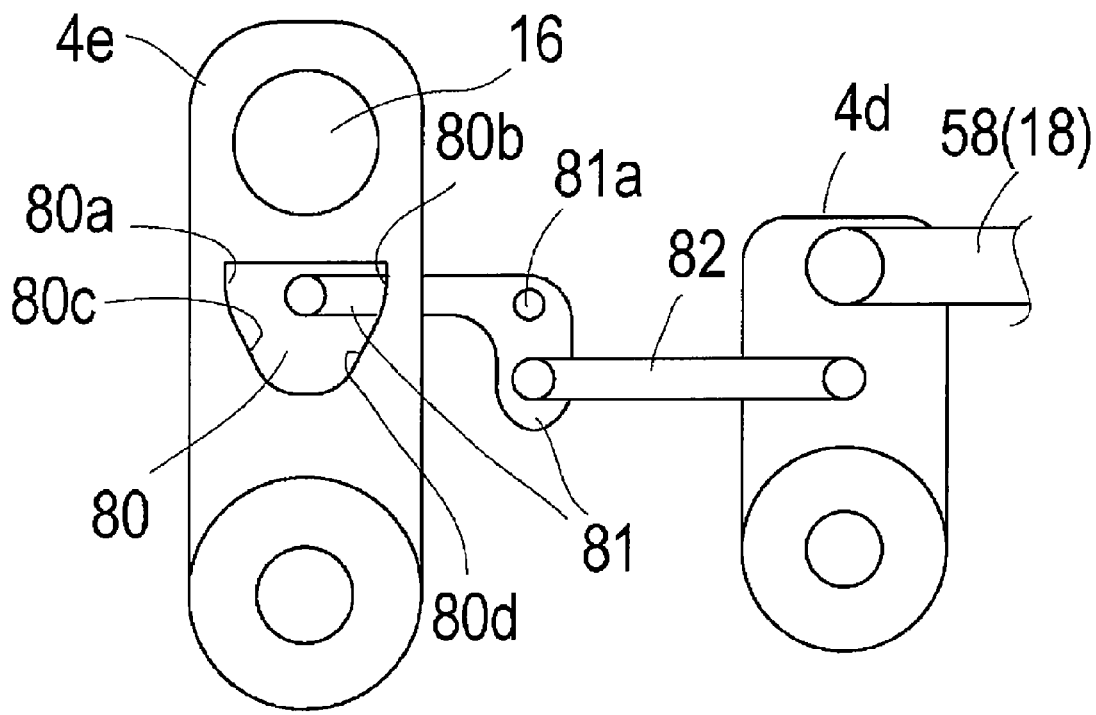
FIG. 10 is a diagram of a linkage between a brake arm and a drive control arm on a transaxle according to a fifth supplemental brake system, when the drive control arm is set in neutral.
Figure 11:
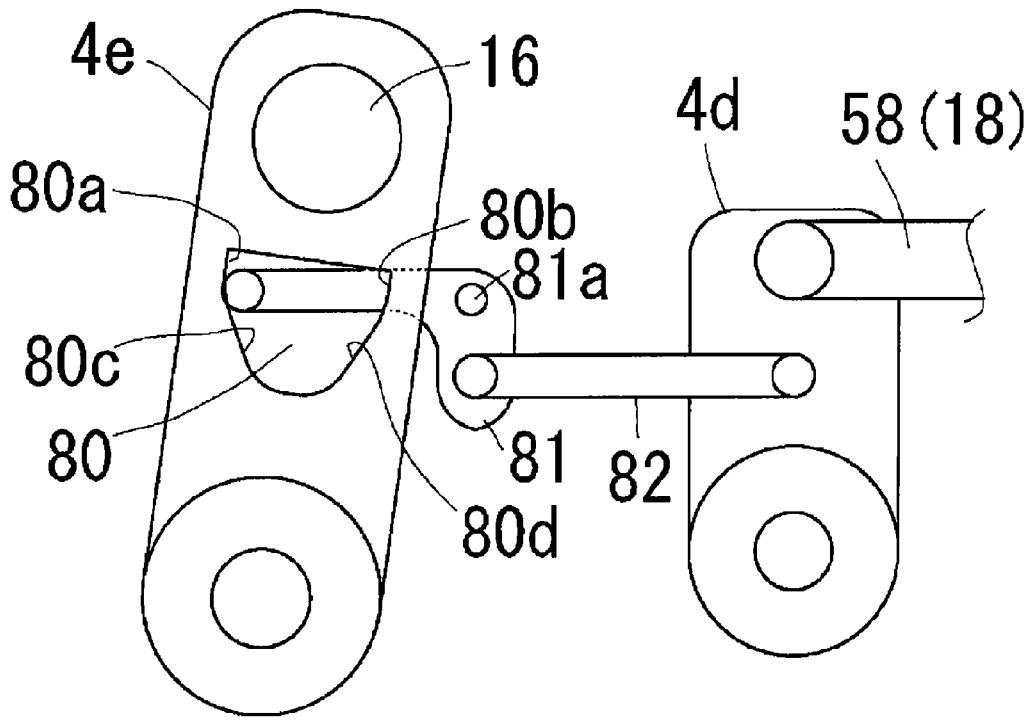
FIG. 11 is a diagram of the linkage according to the fifth supplemental brake system, when the drive control arm is rotated for propelling the vehicle.

With respect FIGS. 10 and 11, it is assumed that brake arm 4d is rotated rightward by depressing brake pedal 11, and drive control arm 4e is rotated rightward for forward traveling and leftward for backward traveling. FIG. 10 illustrates arms 4e and 4d when brake pedal 11 is released and corresponding drive control lever 15 is disposed at the neutral position. The end of link arm 81 is free and unattached in hole 80, that is, separated from ends 80a and 80b and edges 80c and 80d. When brake pedal 11 is depressed, brake arm 4d rotates rightward so as to pull link rod 82 and to rotate link arm 81. While link arm 81 rotates, the end of link arm 81 is kept free in hole 80, so as to keep drive control arm 4e at the neutral position, thereby keeping the neutral state of the corresponding HST.

In other words, referring to FIG. 10, as long as brake arm 4d is disposed at the non-braking position, drive control arm 4e is rotatable following drive control lever 15 freely from the end of link arm 81 in hole 80 until it reaches either the maximum forward or backward traveling speed position. FIG. 11 illustrates arms 4e and 4d when brake pedal 11 is released and corresponding drive control lever 15 is disposed at the maximum forward traveling speed position. In this state, the end of link arm 81 abuts against end 80a of hole 80. If drive control lever 15 is rotated for backward traveling and reaches the maximum backward traveling position, drive control arm 4e is rotated leftward from the neutral position shown in FIG. 10 and the end of link arm 81 comes in contact with end 80b of hole 80.

In the state shown by FIG. 11, when brake pedal 11 is depressed, brake arm 4d rotates rightward so as to pull link rod 82 and to rotate link arm 81. The end of rotating link arm 81 presses edge 80c while it slides on edge 80c from end 80a, thereby pushing drive control arm 4e leftward and returning drive control arm 4e to the neutral position shown in FIG. 10. With respect to the non-illustrated case that drive control arm 4e reaches the maximum backward traveling position and the end of link arm 81 abuts against end 80b, by depressing brake pedal 11, the end of link arm 81 comes to slide on edge 80d and presses edge 80d so as to return drive control arm 4e to the neutral position.

In this way, the fifth alternative supplemental brake system is configured so that when brake pedal 11 is depressed during vehicle 1 operation, the HSTs of left and right transaxles 4 are safely set to the respective neutral states. Even if depressed brake pedal 11 is released, vehicle 1 is kept stationary unless at least one of drive control levers 15 having been set at the respective neutral positions is shifted to a non-braking position.

Figure 12:
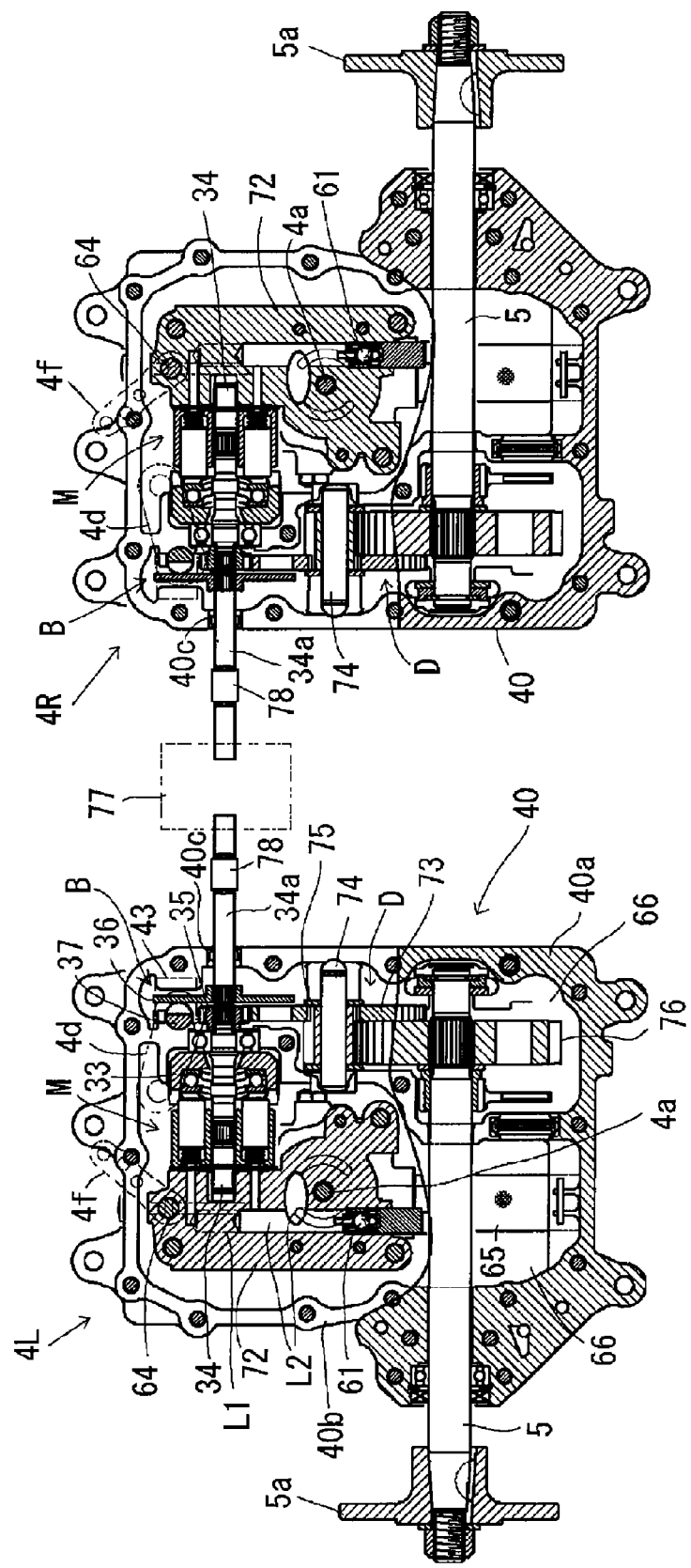
FIG. 12 is a sectional plan view of the left and right transaxles with a first differential lock clutch therebetween.
Figure 13:
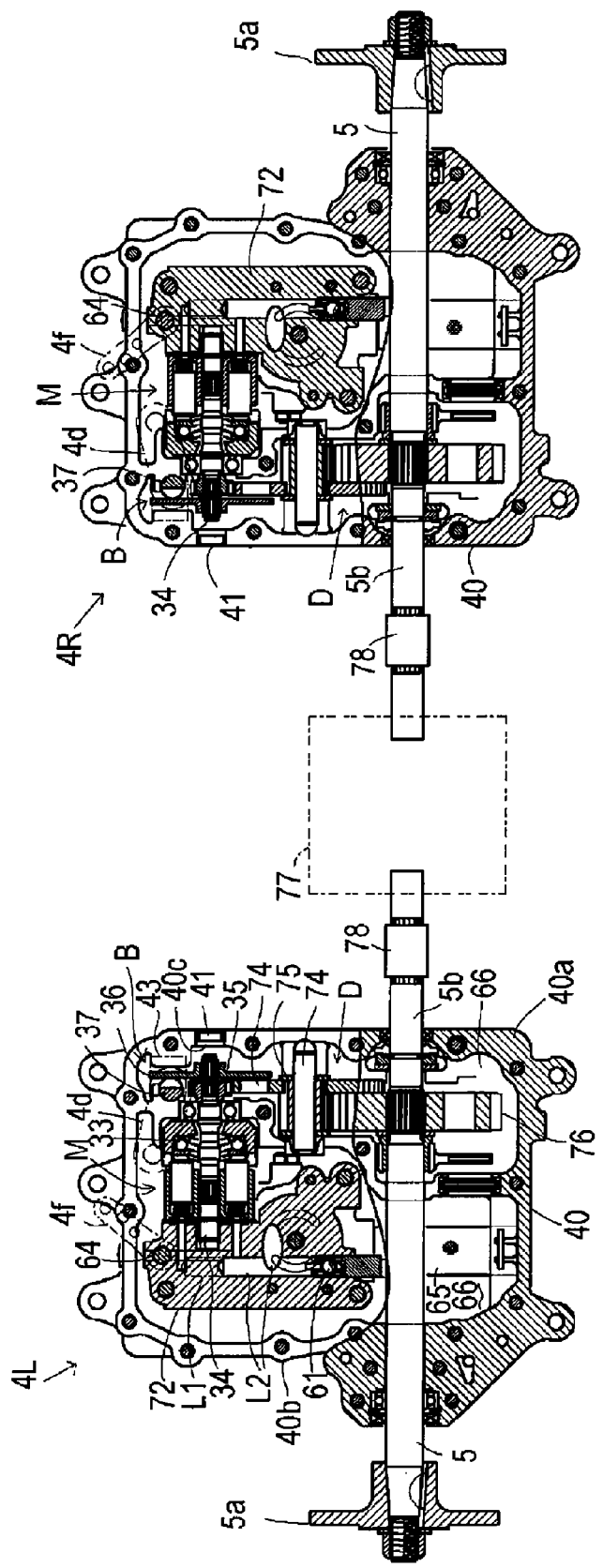
FIG. 13 is a sectional plan view of the left and right transaxles with a second differential lock clutch therebetween.
Figure 14:
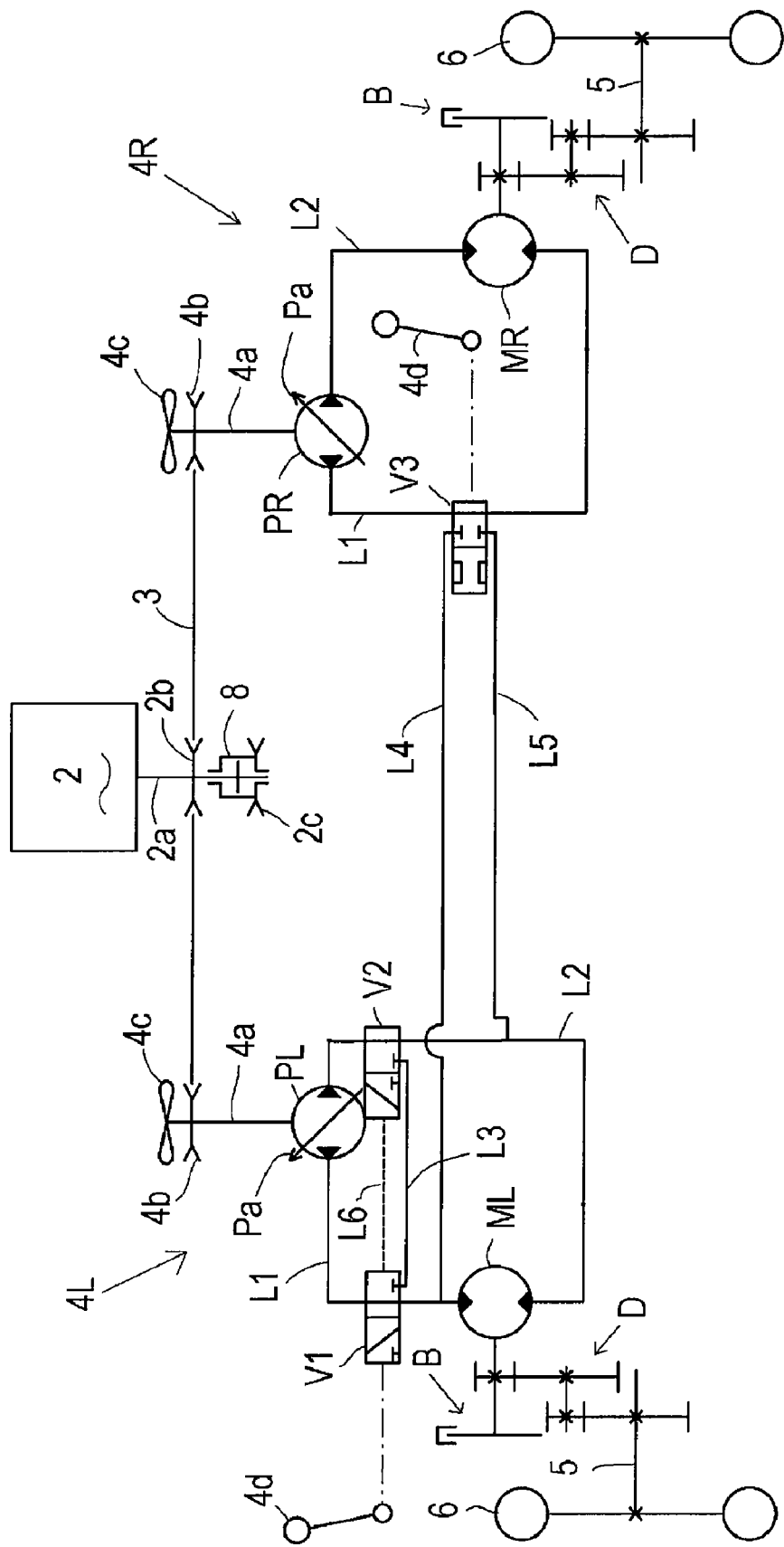
FIG. 14 is a hydraulic and mechanical circuit diagram for hydraulic differential lock according to depression of the brake pedal.

The above-mentioned first through fifth supplemental brake systems are intended to prevent vehicle 1 from suddenly starting immediately after depressed brake pedal 11 is released. In addition to a supplemental brake system, an automatic differential lock system for axles 5 is advantageous for further ensuring safe stopping of vehicle 1. In this regard, vehicle 1 may become oriented in an unexpected direction when it is stopped by depressing brake pedal 11, because differentially rotatable drive wheels 6 sometimes receive different stresses from the ground. Caster or casters 7 tend to accelerate this tendency. An operator must then correct the direction of vehicle 1 by manipulating drive control levers 15 when vehicle 1 restarts. Therefore, if axles 5 are automatically differential-locked according to the depression of brake pedal 11, vehicle 1 is prevented from being oriented in an unexpected direction when it stops. FIGS. 12 to 14 illustrate embodiments of such an automatic differential lock system.

Referring to FIGS. 12 and 13, a structure of transaxle 4 that has not been referred to in the above description of FIGS. 1 to 9 will be described. Axles 5 project laterally outward from respective casings 40 of left and right transaxles 4L and 4R (generally named as transaxles 4), and are fixedly provided on outer ends thereof with respective flanges 5a on which respective wheels 6 are fixed. The HST of each transaxle 4 includes a center section 72 formed therein with fluid passages L1 and L2 so as to mutually fluidly connect hydraulic pump P and motor M mounted thereon. Deceleration gear train D includes a horizontal counter shaft 74 disposed between motor shaft 34 and axle 5 in parallel. An axially long and diametrically small gear 75 is fitted on counter shaft 74, and meshes with a bull gear 76 fixed on axle 5. A diametrically large gear 73 is fixed on a portion of gear 75 offset from bull gear 76, and meshes with motor output gear 35 fixed on motor shaft 34. Brake B, including brake disk 36, is provided on motor shaft 34 as mentioned above.

With respect to the embodiments of FIGS. 12 and 13, left and right transaxles 4L and 4R are symmetric in their inner constructions. In this regard, casing 40 of left transaxle 4L has a left HST chamber incorporating the corresponding HST, including hydraulic pump P (unshown in FIGS. 12 and 13), hydraulic motor M and center section 72, and has a right gear chamber incorporating an extension of motor shaft 34, brake B and deceleration gear train D. Casing 40 of right transaxle 4R has a right HST chamber incorporating the corresponding HST, including hydraulic pump P (unshown in FIGS. 12 and 13), hydraulic motor M and center section 72, and has a left gear chamber incorporating an extension of motor shaft 34, brake B and deceleration gear train D.

In each of the embodiments shown in FIGS. 12 and 13, a differential lock clutch 77, such as a hydraulic clutch or a mechanical clutch, is disposed between left and right transaxles 4L and 4R. Differential clutch 77 is adapted to be clutched on for differential-locking axles 5 according to the depression of brake pedal 11, and to be clutched off for allowing differential rotation of axles 5 according to the release of brake pedal 11. With respect to FIG. 12, motor shafts 34 of left and right transaxles 4L and 4R have respective outer extension portions 34a extended outward from respective casings 40 toward each other through respective holes 40c, and are connected to differential lock clutch 77 therebetween through respective couplings 78. With respect to FIG. 13, axles 5 of left and right transaxles 4L and 4R have respective outer extensions 5b extended outward from respective casings 40 opposite to respective flanges 5a and toward each other, and are connected to differential lock clutch 77 therebetween through respective couplings 78. Alternatively, in a non-illustrated embodiment, countershafts 74 of left and right transaxles 4L and 4R may have respective outer extension portions extended outward from respective casings 40 toward each other, and are connected to differential lock clutch 77 therebetween through respective couplings 78.

The differential lock system shown in FIG. 14 will be described. One of left and right transaxles 4L and 4R (for convenience, in this embodiment, left transaxle 4L) includes a pair of directive changeover valves L1 and L2 disposed on respective fluid passages L1 and L3 between hydraulic pump PL and ML. A bypass passage L3 is interposed between valves V1 and V2. Valves V1 and V2 are operatively connected to brake arm 4d of left transaxle 4L. More specifically, in this embodiment, valve V1 is mechanically connected to brake arm 4d, and a pilot pressure passage L6 is interposed between valves V1 and V2, so as to convert the motion of valve V1 with brake arm 4d to valve V2 into pilot pressure in pilot pressure passage L6 to be transmitted to valve V2. Alternatively, both valves V1 and V2 may be mechanically connected to brake arm 4d.

When brake arm 4d is disposed at the non-breaking position, both valves V1 and V2 are disposed at normal positions, so as to make the regular closed fluid circuit comprising fluid passages L1 and L2 between hydraulic pump PL and motor ML, so that one of valves V1 and V2 passes fluid delivered from hydraulic pump PL to hydraulic motor ML through one of fluid passages L1 and L2, and the other of valves V1 and V2 returns fluid from hydraulic motor ML to hydraulic pump PL through the other of fluid passages L1 and L2. When brake arm 4d is disposed at the braking position, valves V1 and V2 open respective passages between hydraulic pump PL and bypass passage L3, and simultaneously shut off respective passages from hydraulic motor ML. Therefore, when brake pedal 11 is depressed, the fluid delivered from hydraulic pump PL bypasses hydraulic motor ML to return hydraulic pump PL. In other words, in left transaxle 4L, the power transmission from hydraulic pump PL to hydraulic motor ML is cut off.

The other of left and right transaxles 4L and 4R (for convenience, in this embodiment, right transaxle 4R) includes a directive change over valve V3 disposed on one of fluid passages L1 and L2 (in this embodiment, fluid passage L1). A connection passage L4 is interposed between valve V3 and a portion of fluid passage L1 of left transaxle 4L between valve V1 and hydraulic motor ML, and a connection passage L5 is interposed between valve V3 and a portion of fluid passage L2 of left transaxle 4L between valve V2 and hydraulic motor ML.

Valve V3 is operatively connected to brake arm 4d of right transaxle 4R. In this embodiment, valves V1, V2 and V3 are distributed to be operatively connected to respective brake arms 4d of left and right transaxles 4L and 4R. Alternatively, all valves V1, V2 and V3 may be operatively connected to only one of brake arms 4d. The only requirement is to operatively connect all valves V1, V2 and V3 to brake pedal 11.

When brake arm 4d is disposed at the non-breaking position, valve V3 makes the closed fluid circuit of right transaxle 4R between hydraulic pump PR and motor MR independently of the closed fluid circuit of left transaxle 4L between hydraulic pump PL and ML. When brake arm 4d is disposed at the braking position, valve V3 connects hydraulic pump PR to connection passage L4, and simultaneously, connects hydraulic motor MR to connection passage L5. Consequently, a closed fluid circuit is made to fluidly connect left and right hydraulic motors ML and MR in series to hydraulic pump PR, independently of hydraulic pump PL. Because left and right hydraulic motors ML and MR fluidly connected in series, hydraulic pump PR cannot differentially rotate, and left and right axles 5 which are drivingly connected to respective hydraulic motors ML and MR are differential-locked.

Incidentally, in this embodiment, valves V1, V2 and V3 are operatively connected to brake arms 4d so as to associate the differential lock operation with the brake operation. Alternatively, a differential lock operation device (such as a lever) may be provided in addition to brake arms 4d and operatively connected to valves V1, V2 and V3, so as to be optionally operable for differential locking of axles 5.

It is further understood by those skilled in the art that the foregoing description is a preferred embodiment of the disclosed device, and that various changes and modifications may be made in the invention without departing from the scope thereof defined by the following claims.

What is claimed is:

1. A supplemental brake system of a zero turn vehicle comprising:
    a prime mover;
    a brake pedal;
    a pair of axles;
    a pair of transaxles driven by the prime mover so as to drive the respective axles, the transaxles including respective brakes for braking the respective axles according to depression of the brake pedal; and
    a supplemental braking means for stopping the prime mover so as to stop transmission of power from the prime mover to the pair of transaxles according to depression of the brake pedal,
    wherein the stopped prime mover is restarted when it is recognized that both the transaxles are set in neutral while the depression of the brake pedal is kept.

2. The supplemental brake system according to claim 1, the supplemental braking means including:
    a sensor disposed adjacent to the brake pedal so as to detect whether the brake pedal is depressed or not.

3. The supplemental brake system according to claim 1, the supplemental braking means including:
    a sensor disposed adjacent to a portion of at least one of the transaxles operatively connected to the brake pedal, so as to detect whether the brake pedal is depressed or not.

4. The supplemental brake system according to claim 1, further comprising:
    a belt transmission interposed between the prime mover and the pair of transaxles, wherein the supplemental braking means includes a belt clutch of the belt transmission so that the belt clutch is disengaged according to depression of the brake pedal, so as to stop the power transmission through the belt transmission from the prime mover to the pair of transaxles.

5. The supplemental brake system according to claim 1, further comprising:
    an equalizer interposed between the brake pedal and the pair of brakes of the respective transaxles so as to evenly apply the brakes according to depression of the brake pedal.

6. The supplemental brake system according to claim 1, further comprising:
    a differential lock device interposed between the transaxles so as to lock the axles to each other according to depression of the brake pedal.

* * * * *